United States Patent
Gineste et al.

(10) Patent No.: US 9,843,957 B2
(45) Date of Patent: Dec. 12, 2017

(54) METHOD OF CONTROLLING CONGESTION FOR CONTENTION ACCESS NETWORK

(71) Applicant: THALES, Neuilly-sur-Seine (FR)

(72) Inventors: Mathieu Gineste, Toulouse (FR); Olivier Gibert, Toulouse (FR)

(73) Assignee: Thales, Courbevoie (FR)

( * ) Notice: Subject to any disclaimer, the term of this patent is extended or adjusted under 35 U.S.C. 154(b) by 447 days.

(21) Appl. No.: 14/245,244

(22) Filed: Apr. 4, 2014

(65) Prior Publication Data
US 2014/0301209 A1 Oct. 9, 2014

(30) Foreign Application Priority Data
Apr. 5, 2013 (FR) ...................................... 13 00787

(51) Int. Cl.
*H04W 74/08* (2009.01)
*H04W 28/02* (2009.01)
*H04L 12/841* (2013.01)
*H04L 12/26* (2006.01)

(52) U.S. Cl.
CPC ......... *H04W 28/0215* (2013.01); *H04L 47/28* (2013.01); *H04W 74/0841* (2013.01); *H04L 43/0888* (2013.01)

(58) Field of Classification Search
CPC ........... H04W 4/005; H04W 74/0833–74/0858
See application file for complete search history.

(56) References Cited

U.S. PATENT DOCUMENTS

| 2006/0171418 A1 | 8/2006 | Casini et al. | |
| 2007/0195730 A1* | 8/2007 | Cheng | H04W 72/04 370/329 |
| 2012/0033613 A1* | 2/2012 | Lin | H04W 74/085 370/328 |
| 2012/0040700 A1* | 2/2012 | Gomes | H04W 4/003 455/500 |
| 2013/0051228 A1* | 2/2013 | Kim | H04W 4/005 370/230 |
| 2014/0064110 A1* | 3/2014 | Viorel | H04W 8/005 370/252 |

(Continued)

FOREIGN PATENT DOCUMENTS

| EP | 1686746 A1 | 8/2006 |
| WO | 0021244 A2 | 4/2000 |

*Primary Examiner* — Marcus R Smith
(74) *Attorney, Agent, or Firm* — Baker Hostetler LLP

(57) ABSTRACT

A method of controlling congestion in a communications network comprising a plurality of terminals, comprises the steps of: receiving a message or a message fragment at a given instant; evaluating the number of terminals currently sending; defining a congestion window, of duration $\Delta Tf$ configured so as to be proportional to the number N of terminals currently sending and inversely proportional to the maximum input loading G of the network which makes it possible to obtain a substantially zero rate of retransmissions; for each terminal and each message or message fragment to be sent, make the start of the congestion window coincide with the given instant of receipt of a message or message fragment and define an actual instant of sending of the message or message fragment as a random value taken in the congestion window.

14 Claims, 2 Drawing Sheets

(56) References Cited

U.S. PATENT DOCUMENTS

2014/0302846 A1* 10/2014 Zou .................. H04W 28/0289
455/435.1
2015/0173074 A1* 6/2015 Zhao .................. H04W 74/085
370/336

* cited by examiner

METHOD OF CONTROLLING CONGESTION FOR CONTENTION ACCESS NETWORK

CROSS-REFERENCE TO RELATED APPLICATION

This application claims priority to foreign French patent application No. FR 1300787, filed on Apr. 5, 2013, the disclosure of which is incorporated by reference in its entirety.

FIELD OF THE INVENTION

The invention relates to a method of controlling congestion in a communication network shared by a plurality of terminals seeking to access the resources of the network in order to communicate. The invention also relates to a congestion control device suitable for executing the method of controlling congestion according to the invention in a manner which is centralized for all the terminals of the network.

An aim of the invention is to devise a procedure for controlling congestion resulting from the transmission of packets of data or fragments of packets by a large number of terminals sharing one and the same communication resource. The invention is notably suitable for networks using contention access, that is to say which implement a contention access procedure which may induce collisions between packets sent by several terminals on the same resource, for example on one and the same timeslot.

More precisely, the invention is aimed at providing a solution which makes it possible to reduce the lag for correct transmission of a packet for a sizable number of simultaneously communicating terminals.

BACKGROUND

Contention access procedures of ALOHA or Slotted ALOHA type are known. These procedures are based on random-access protocols. Each user accesses the transmission resources in an independent manner in relation to the other users. For each packet transmitted, the user waits for an acknowledgement of receipt from the recipient. If it does not receive it, it retransmits the same data with a random delay and this mechanism is repeated until receipt of an acknowledgement of receipt or until a maximum number of attempts have been made.

This type of procedure exhibits the drawback of significantly lengthening the lag in transmitting a packet when retransmissions are required, including at relatively low loading of the communication network (that is to say when there are few terminals with respect to the resource available) since there is no provision for a mechanism for substantially and preventively decreasing the initial rate of collisions between packets sent by distinct senders and therefore the retransmission rate, and this may give rise to appreciable lags.

So-called CRDSA (Contention Resolution Diversity Slotted ALOHA) contention access procedures are also known, such as described for example in the European patent published under the number EP 1 686 746 B1. For each packet to be sent, one or more replicas of this packet are generated and transmitted, simultaneously with the source packet and with a random transmission lag drawn initially from within a window corresponding to the logical frame following the arrival of the packet. This mechanism allows the receiver to reconstruct a packet that may possibly have been lost because of a collision by virtue of the redundancy introduced by way of the replicas sent and by virtue of collided packet interference cancellations if a packet or a replica originating from another sender were able to be decoded on another position in the frame.

The congestion control algorithm defined, for a so-called CRDSA procedure, in the European patent published under the number EP 1 686 746 B1 uses an item of information on the loading of the network. The way in which this network loading is evaluated is however not specified. An item of information on the loading of the network originating from a central entity is transmitted regularly to the various terminals. If this loading exceeds a threshold, each terminal will increase, according to a decreasing probability and in an independent manner, the transmission delay for the fragments that it must send by an additional logical frame. If the loading decreases below the threshold, the terminal will also decrease, according to a given probability, the delay in sending its fragments by a logical frame. Each terminal will therefore wait for a different number of logical frames as a function of the inherent evolution of its congestion window, knowing that a fragment and its replicas will be able to be transmitted only on a single logical frame. The expression logical frame is understood to mean a fixed-duration time interval defined by the standard or the system employed to communicate and which constitutes the temporal unit making it possible to fix a marker to the senders and to the receivers for the transmission and the reception of the data packets or the fragments of these packets. A logical frame can be composed of a given number of elementary physical frames or slots. In particular, in the case of contention access procedures which, for each fragment of useful data to be sent, generate one or more redundant fragments, such as for example the CRDSA procedure, all the fragments (useful and redundant) are transmitted in a logical frame.

The approach advocated with regard to congestion control in the European patent published under the number EP 1 686 746 B1, is an approach which reacts to the overloading of the transmission channel by using a notion of loading threshold and which is therefore not a preventive approach. A non-negligible number of collisions may thus occur temporarily at the moment at which the threshold is crossed and it may happen that the reaction time to this overload being too large, this gives rise to retransmissions of messages or message fragments giving rise to an increase in the message transmission lag. This approach also involves a policy for control of congestion and access to the distinct channel between terminals and which is not managed in a centralized manner, and this may potentially penalize certain terminals and favour others. This approach may potentially give rise to an inequity between the user terminals and makes it difficult to apply distinct quality-of-service levels for packets originating from one and the same terminal or different terminals. These procedures also exhibit the drawback of artificially increasing the loading of the network on account of the replicas systematically generated for each packet to be sent, thereby making it more difficult to evaluate the actual loading, stated otherwise the loading related to the useful data.

SUMMARY OF THE INVENTION

The congestion control method proposed by the invention consists of a preventive procedure making it possible to decrease the rate of initial collisions (or initial unresolved collisions for procedures sending several data packets for one useful packet) between packets sent by several senders.

Thus, the number of retransmissions required becomes substantially zero and the lag in transmitting a packet to its destination is substantially shortened.

The present invention is differentiated notably from the known congestion control procedures in that it consists of a preventive and non-reactive approach to the congestion of the network, the objective being to minimize the number of retransmissions. The method according to the invention is executed in a centralized manner (no need for teledetection capability in respect of the senders), thus all the active terminals use, at a given instant, the same congestion window, thereby making it possible to precisely control the congestion level and to ensure equity between terminals. In the case of contention access procedures using redundant fragments in addition to the useful fragment to be sent, the notion of logical frame of fixed duration is dispensed with from the point of view of the method of congestion control in favour of a sliding congestion window of variable size which permanently adapts to the number of active terminals in the communication network. Indeed, the invention takes into account the number of active terminals at each instant in order to dimension the congestion window.

The subject of the invention is a method of controlling congestion in a communications network comprising a plurality of terminals able to send a message, the said method being characterized in that it comprises the following steps:
Receive a message or a message fragment at a given instant,
Evaluate the number of terminals currently sending,
Define a time interval, called a congestion window, of duration $\Delta Tf$ configured so as to be proportional to the number N of terminals currently sending and inversely proportional to the maximum input loading G of the network which makes it possible to obtain a substantially zero rate of retransmissions,
For each terminal and each message or message fragment to be sent, make the start of the congestion window coincide with the said given instant of receipt of a message or message fragment and define an actual instant of sending of the said message or message fragment as a random value taken in the congestion window.

According to a particular aspect of the invention, the duration $\Delta Tf$ is normalized with respect to a time unit related to the duration of sending of a message or message fragment and is taken equal to $$\Delta T_f = \frac{N \times 2}{G}.$$

According to a particular aspect of the invention, the maximum input loading G of the network which makes it possible to obtain a substantially zero rate of retransmissions is determined analytically or by simulation by varying the input loading of the network and by comparing it with the output loading, the input loading G retained being the maximum value of the input loading for which the output loading is substantially equal to the input loading.

According to a particular aspect of the invention, for each message or message fragment to be sent, at least one redundant message or message fragment is generated, the actual instant of sending of a redundant message or message fragment being defined as a random value taken in the said congestion window whose start coincides with the given instant of receipt of the said message or message fragment to be sent, the input loading G of the network is replaced with the normalized input loading of the network equal to the network input loading G divided by the total number of messages or message fragments associated with a message or message fragment to be sent.

According to a particular aspect of the invention, the duration $\Delta Tf$ of the congestion window and the instant of sending of the said message are defined as integer numbers of timeslots, a timeslot having a constant duration at least equal to the duration required to transmit a message or message fragment.

The method according to the invention can furthermore comprise a step of transmitting the said message or message fragment to be sent or the said redundant message or message fragment with a delay equal to the said actual instant of sending.

According to a particular aspect of the invention the number N of terminals currently sending is evaluated by executing the following sub-steps, for each message sent by a terminal in the form of at least one fragment:
Identify the index number or the position of the fragment sent from among the fragments belonging to the said message,
If the fragment sent is the $1^{st}$ fragment of a message, increment by one unit the number N of terminals currently sending,
If the fragment sent is the last fragment of a message, decrement by one unit the number N of terminals currently sending,
If the fragment sent is the sole fragment of a message, increment by one unit the number N of terminals currently sending and then decrement, after a predetermined duration, by one unit the number N of terminals currently sending.

The subject of the invention is also a device for the control of congestion in a communications network comprising a plurality of terminals able to send a message, the said device being characterized in that it comprises first means suitable for evaluating the number of terminals currently sending and defining a time interval, called a congestion window, of duration $\Delta Tf$ configured so as to be proportional to the number N of terminals currently sending and inversely proportional to the maximum input loading G of the network which makes it possible to obtain a substantially zero rate of retransmissions and second means suitable for transmitting, at a given frequency, to all the terminals of the network an item of information making it possible to deduce the duration $\Delta Tf$ of the congestion window.

According to a particular aspect of the device according to the invention, the said first means are suitable for executing the following sub-steps, for each message sent by a terminal in the form of at least one fragment:
Identify the index number or the position of the fragment sent from among the fragments belonging to the said message,
If the fragment sent is the $1^{st}$ fragment of a message, increment by one unit the number of terminals currently sending,
If the fragment sent is the last fragment of a message, decrement by one unit the number of terminals currently sending,
If the fragment sent is the sole fragment of a message, increment by one unit the number of terminals currently sending and then decrement, after a predetermined duration, by one unit the number of terminals currently sending.

The subject of the invention is also a sender terminal able to send a message in a communications network comprising a plurality of the said terminals, characterized in that it comprises first means suitable for receiving an item of information making it possible to deduce the duration ΔTf of a time interval, called a congestion window, within which the said message can be sent, second means suitable for defining the actual instant of sending of the said message or of a fragment of the said message as a random value taken in the congestion window whose start coincides with the given instant of receipt of the said message and third means able to transmit the said message or message fragment with a delay equal to the said sending instant defined.

The subject of the invention is further a communication network comprising a plurality of sender terminals according to the invention and at least one device for controlling congestion within the said network according to the invention.

The subject of the invention is further a computer program comprising instructions for the execution of the method of controlling congestion according to the invention, when the program is executed by a processor as well as a recording medium readable by a processor on which is recorded a program comprising instructions for the execution of the method of controlling congestion according to the invention, when the program is executed by a processor.

BRIEF DESCRIPTION OF THE DRAWINGS

Other characteristics and advantages of the present invention will become more apparent on reading the description which follows in relation to the appended drawings which represent.

DETAILED DESCRIPTION

Figure 1:
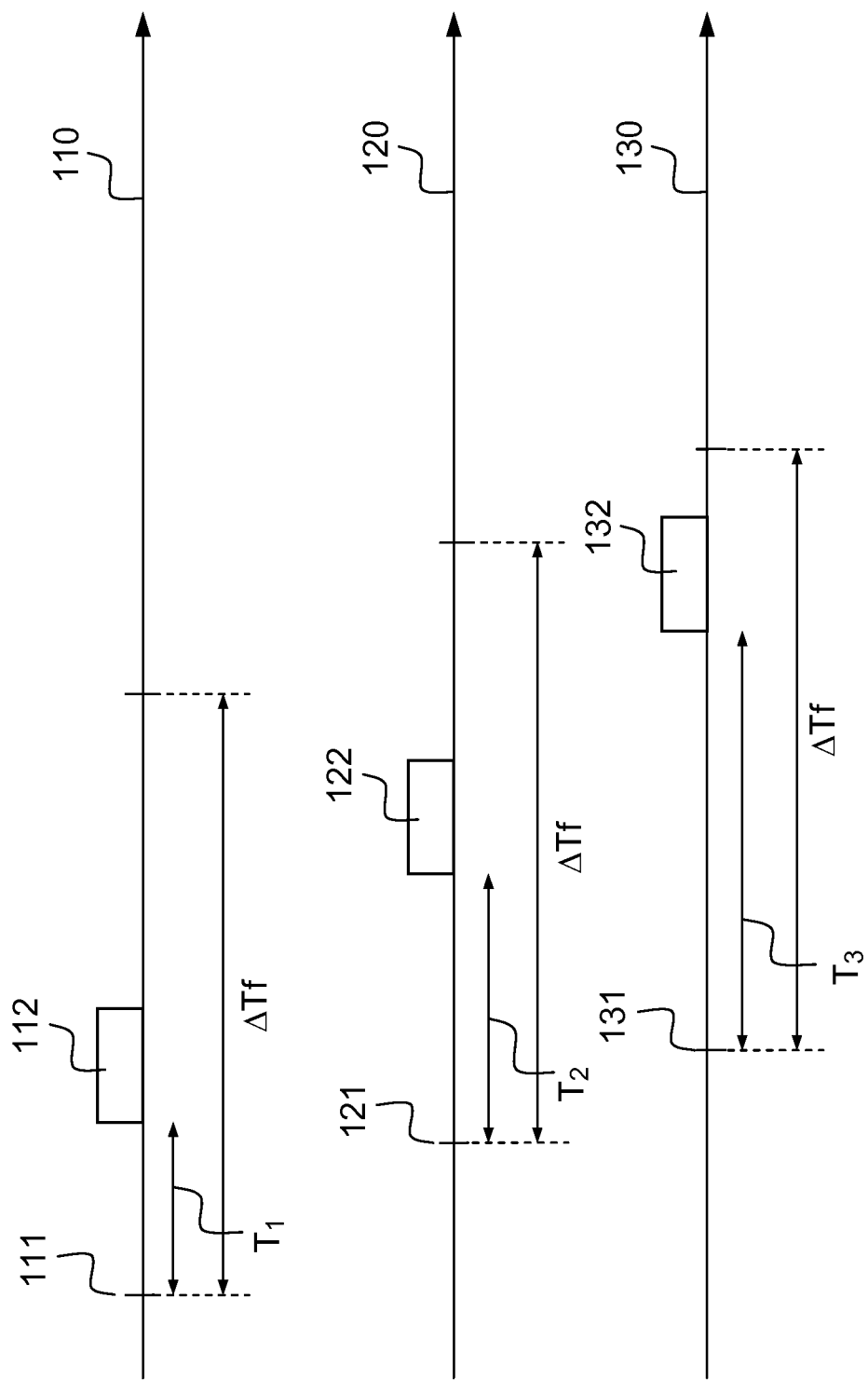
FIG. 1, a basic diagram illustrating the operation of a method of controlling congestion according to the invention, FIG. 2, a flowchart describing the steps for implementing the method of controlling congestion according to the invention, FIG. 3, a diagram of a communications network within which the method of controlling congestion according to the invention is implemented.

FIG. 1 illustrates, in a basic diagram, the operation of the method of controlling congestion according to the invention.

In FIG. 1 are represented three time axes 110,120,130 associated with three distinct sender terminals forming part of one and the same communication network. The senders can be fixed or mobile or on board a carrier, for example an aircraft. Communication within the network can comply with a telecommunication standard, for example suitable for aeronautical or space communications. The communication link between a sender and a receiver can be direct or be composed of several communication segments, for example an upgoing segment between a sender and a satellite and a downgoing segment between the satellite and a receiver.

To communicate, each sender is able to generate data in the form of packets or messages. A packet can be fragmented into several fragments of reduced fixed size. Each packet, or each packet fragment, is transmitted for a time interval of fixed duration called a timeslot. According to the transmission standard used within the network, a timeslot can also have a variable duration, this being notably the case when the data to be sent are protected by a corrector code using different code rates per timeslot. Access to the temporal resources is performed at the tempo of a slot.

In an alternative embodiment of the invention, each packet, or each packet fragment is transmitted on the fly without complying with a temporal slicing into slots of fixed or variable duration.

Subsequently the term packet, message or fragment will be employed interchangeably to designate the data sent at an instant by a sender.

FIG. 1 illustrates the manner of operation of the method according to the invention for three sender terminals seeking to access the temporal communication resources simultaneously. The example of FIG. 1 is of course illustrative and wholly non-limiting. In an actual case, the number of simultaneously active terminals is much greater than three.

In the example of FIG. 1, a first terminal seeks to access the communication resources so as to send a packet or packet fragment 112, at a first instant 111. Instead of sending this packet 112 instantaneously, that is to say at the first instant 111, the first terminal randomly draws a value in a time interval of predetermined duration ΔTf, called a congestion window. The duration of this window is calculated by a central entity capable of receiving the communications of all the sender terminals; its calculation will be explained further on. The random value T1 drawn in the interval of duration ΔTf corresponds to the effective instant of sending of the packet 112.

The method described in respect of the first terminal is applied in the same manner in respect of a second terminal which seeks to transmit a second packet 122 at a second instant 121. A random draw in the current congestion window determines the instant T2 of sending of the second packet 122. This congestion window is of identical duration ΔTf to that used for the first terminal unless its duration has been updated between the sending of a first packet 112 by a first terminal and the sending of a second packet 122 by a second terminal.

The method applies identically in respect of the sending of a third packet 123 by a third terminal at a sending instant T3 determined by random drawing in the congestion window of duration ΔTf.

The congestion window is a sliding window, that is to say its start always coincides with the instant 111,121,131 of handling of a packet, stated otherwise the instant of receipt of a packet by the method according to the invention.

The duration of the congestion window can be expressed as an integer number of timeslots or directly as a time unit when access to the temporal resources is not organized into slots. The method according to the invention is applied in an identical manner in respect of all the packets to be sent, including the packets retransmitted when an acknowledgement of receipt is not correctly received by the sender.

In the particular case where a contention access procedure of CRDSA type is used, several redundant fragments may be generated for a useful fragment to be transmitted. In this case, the congestion window used for the transmission of the useful fragment and the redundant fragments is the same and starts at the instant of handling of the useful fragment.

The invention differs notably from the usual congestion control procedures in that all the packets to be sent, including the first packets, are sent with a random temporal stagger depending directly on the number of active terminals and based on a sliding congestion window of variable size. The lower bound of the congestion window corresponds to the instant at which the terminal wishes to send a packet and the upper bound of the congestion window varies as a function of the number of active terminals. By proceeding thus, the initial rate of collisions between packets sent by various senders is decreased in such a way as to render the rate of retransmission of these packets negligible and the lag for transmission and correct reception of a packet is improved. This improvement has all the more impact for communications having a sporadic traffic profile and for services having constrained requirements in terms of lag, this being the case notably for certain aeronautical communications in particular if these communications use a satellite technology for their transport.

The congestion window is determined by a central entity, for example a congestion control device which is suitable for evaluating, at each instant, the number of active terminals, that is to say that are currently sending. As a function of this number, the duration of the congestion window is modulated. In particular, the more sizable the number of active terminals, the more necessary it is for the congestion window to be large so as to limit the collisions between packets sent by various terminals and thus to limit to the maximum the number of retransmissions that may involve a sizable lag notably for technologies having high propagation times (such as satellite-based transmission technologies for example). On the contrary, when the number of active terminals decreases, the congestion window can be reduced so as to decrease the lag in transmitting the packets to their destination. The evaluation of the number of terminals active at a given instant can be done by diverse procedures, an example of which is given further on in the description.

An exemplary embodiment, according to the invention, of the calculation of the duration of the congestion window is now described in greater detail.

The duration of the congestion window is calculated so as to be at a level of loading in the network which makes it possible to limit the rate of retransmission of the fragments and indirectly to limit the total lag in transmitting a packet.

Accordingly, as a function of the number of terminals currently transmitting, the congestion window is adapted so as to remain at a loading level which makes it possible to limit this retransmission rate.

The mean loading level generated by a terminal using a congestion window of duration $\Delta Tf$ can be estimated in the following manner.

Each active terminal performs a random draw in a uniform manner in the congestion window, corresponding to a value lying in the interval [0, $\Delta Tf$], so as to dispatch each useful or redundant fragment on the communication channel. The random value drawn is converted into a delay, expressed directly as a time unit or as a number of timeslots, and which is used to delay the sending of each fragment.

Thus, each fragment is sent with a mean delay equal to $\Delta Tf/2$, thereby corresponding to a mean traffic equal to $2/\Delta Tf$ fragments per time unit. The duration $\Delta Tf$ is normalized with respect to a time unit related to the duration of sending of a fragment. In the calculations which follow, the assumption is made of a constant fragment size and therefore of a constant duration of sending of a fragment on a given channel which corresponds to the time unit. In the case of a so-called slotted channel, the time unit corresponds to the duration of the slot (if the latter is of constant duration).

Each terminal generates the following loading $G_{terminal}$ for the transmission of a packet:

$$G_{terminal} = \frac{\text{nb\_fragments} \times 2}{\Delta T_f}$$

nb_fragments corresponds to the number of fragments sent for the transmission of a useful data fragment, stated otherwise this number encompasses any redundant fragments that may possibly be generated.

All together, the active terminals within the network therefore generate the following loading:

$$G = \frac{N \times \text{nb\_fragments} \times 2}{\Delta T_f},$$

with N the number of active terminals.

The loading generated by possible retransmissions is intentionally omitted since the objective is to be at a loading level for which the rate of retransmission of the packets is negligible. A value of $\Delta Tf$ will be calculated permanently, as a function of the number of active terminals, making it possible to remain at a loading level of the channel for which this negligible rate of retransmission of the packets is maintained. Thus the more the number of active terminals increases, the more the congestion window will stretch (by way of its upper bound) and the more the number of active terminals decreases, the more the congestion window will decrease. The size of the window ignores the notion of logical frame or super frame employed in certain contention access procedures of the prior art and considers a sliding window, the beginning of which coincides with the moment at which a terminal must transmit a packet on the communication channel.

The value of the upper bound of the congestion window $\Delta Tf$ can therefore be deduced therefrom as follows:

$$\Delta T_f = \frac{N \times \text{nb\_fragments} \times 2}{G} \quad (1)$$

In the case where no redundant fragment is generated, for example in the case of contention access procedures of ALOHA or slotted ALOHA type, relation (1) reduces to $$\Delta T_f = \frac{N \times 2}{G}. \quad (2)$$

For the contention access procedures which use redundant fragments, the normalized loading is defined by $G = \text{nb\_fragments} \times G_{normalized}$ which corresponds to the loading generated by the useful data with the exception of the redundant data. In this case relation (1) may be written:

$$\Delta T_f = \frac{N \times 2}{G_{normalized}}. \quad (3)$$

In all cases, the duration $\Delta Tf$ is a duration normalized with respect to a time unit which can be a slot or the duration of sending of a fragment.

The value of the target loading G used to determine the duration $\Delta Tf$ of the congestion window is determined by simulation or analytically in the following manner.

The exchanges between sender and receiver terminals are simulated taking into account the envisaged contention access procedure and the parameters used by this procedure (for example the number of redundant fragments, etc.). The loading at the input of the network, that is to say the number of fragments sent and the loading at the output of the network, that is to say the number of fragments correctly received by a receiver, are measured. When the number of fragments to be sent increases, collision phenomena occur which induce losses of fragments during reception. The value G of the network loading used for the determination of the duration ΔTf of the congestion window is the maximum input loading simulated or calculated analytically which makes it possible to obtain an output loading substantially equal to the input loading. When the output loading deviates significantly from the input loading, this signifies that unresolvable collisions occur, therefore giving rise to retransmissions.

Stated otherwise, the value G of the network loading used for the determination of the duration ΔTf of the congestion window is equal to the maximum loading which makes it possible to obtain a substantially zero unresolved rate of collisions.

In the case of contention access procedures which use redundancy fragments, the loading G is replaced with the normalized loading.

The target value of the loading, or of the normalized loading, is calculated initially, by simulation or analytically, once and for all and as a function of the contention access procedure envisaged and of any possible parametrization thereof (for example the number of redundant fragments used, etc.).

The duration ΔTf of the congestion window is thereafter calculated as a function of the target loading G and of the number of terminals N that are active at a given instant in the network, as a function of one of relations (1), (2) or (3)

To evaluate the number of terminals active at a given instant, a possible procedure is now described. Each packet fragment sent comprises an item of information making it possible to identify the index number or the position of this fragment from among all the fragments sent arising from the fragmentation of one and the same packet. It is therefore possible to identify the first fragment of a packet. Likewise the last fragment arising from the fragmentation of one and the same packet comprises an item of information making it possible to identify it as such. Thus, it is possible to identify the last fragment of a packet.

The congestion control device according to the invention receives the fragments sent by the various senders and deduces therefrom whether this fragment is the first or the last of a packet. Alternatively the congestion control device according to the invention can receive directly the item of information, for example transmitted by an access point of the network, identifying the index number or the position of the fragment. The device according to the invention permanently updates a counter N of the number of active terminals. This counter, initialized to 0, is incremented by 1 when a first fragment of a packet is sent and is decremented by 1 when a last fragment of a packet is sent. When the packet to be transmitted is not fragmented, this being the case notably when it is of reduced size, the counter N of the number of active terminals is incremented by 1 and then is decremented by 1 after a predetermined duration. Other techniques for evaluating the number of active terminals can be envisaged, for example based on information relating to the use of the resource and the rate of successful decoding.

The duration of the congestion window is thereafter calculated as a function of the value of the counter N and is then transmitted to the senders of the network at a given frequency. The transmission of the congestion window to the senders of the network can be performed at each updating of the window or after a given number of modifications of the window or else at regular intervals as a function of the variability, strong or otherwise, of the number of active terminals in such a way as to limit the lag and also the signalling associated with the dispatching of this item of information to the senders of the network. The congestion window is therefore updated regularly so as to adapt to the loading conditions of the network. A margin of error in the evaluation of the number N of active terminals can be integrated with the calculation of the duration of the congestion window so as to take into account the way in which this number of active terminals evolves.

In a variant embodiment of the invention, several distinct congestion windows can be defined as a function of various service classes associated with each fragment to be sent. A benefit of using several congestion windows is that of affording certain service classes priority in relation to others. For example, a congestion window of shorter duration can be allocated to certain terminals or to certain priority messages and a more sizable congestion window can be allocated to other terminals or messages of lower priority.

Figure 2:
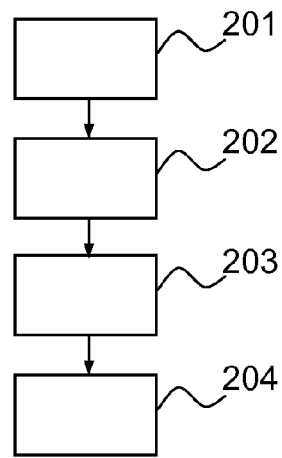

FIG. 2 shows diagrammatically, in a flowchart, the steps for implementing the method according to the invention.

The method according to the invention consists in executing the following steps. In a first step 201, the number of terminals currently sending is evaluated. In a second step 202, the duration of the congestion window is calculated as a function of the number of terminals currently sending. In a third step 203, each terminal which wishes to send a packet or a packet fragment randomly draws a value in the congestion window so as to determine the actual instant of sending of the packet or fragment. When redundant fragments are generated in addition to the useful fragment, the random draws associated with the redundant fragments are performed in the same congestion window as that used for the useful fragment. In a last step 204, the packet or packet fragment is transmitted at the sending instant calculated.

Figure 3:
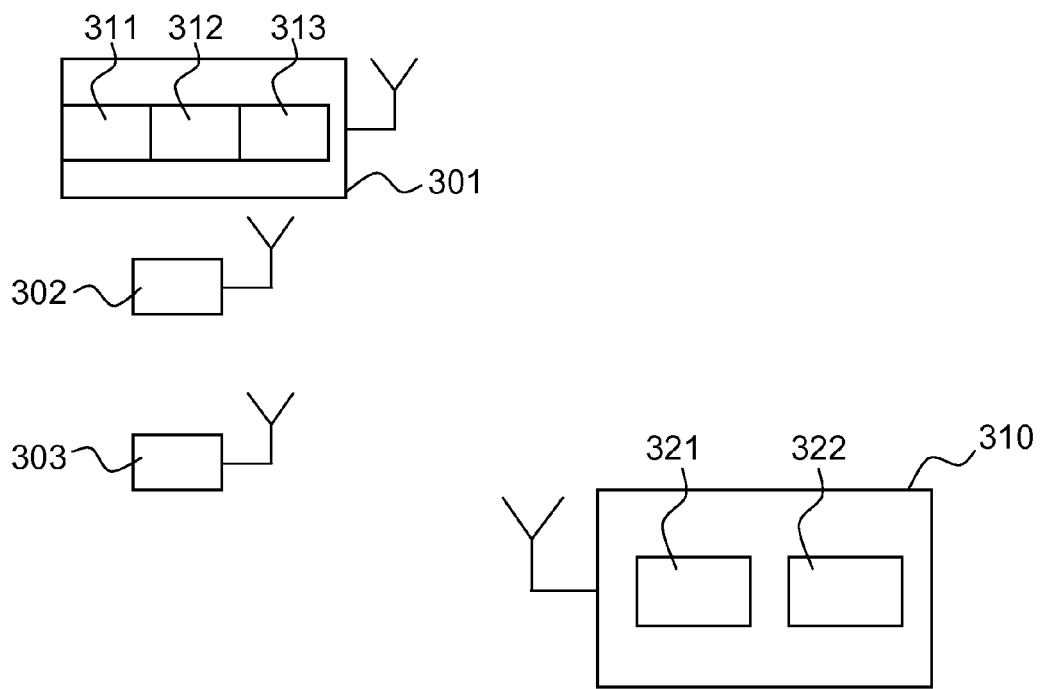

FIG. 3 shows diagrammatically an exemplary communication network in which the method according to the invention is applied.

The network comprises a plurality of sender terminals 301,302,303 according to the invention. A sender terminal 301 comprises first means 311 suitable for receiving an item of information making it possible to deduce the duration of the congestion window, second means 312 suitable for performing a random draw in the congestion window so as to define the instant of sending of a message and third means 313 able to transmit a message or a message fragment at the sending instant defined.

The first, second and third means constituting a sender terminal according to the invention can be distinct or be merged into a single entity. They can be implemented by hardware circuits or software modules. For example they can consist of a network protocol stack, of an access layer for the transmission medium and of a physical layer complying with the communication norm imposed by the network.

The network also comprises a congestion control device 310 able to communicate with the various senders 301,302, 303 of the network. The device 310 comprises first means 321 suitable for evaluating the number of terminals currently sending in the network and for defining the duration of a congestion window as a function of this number, for example by applying the procedure described hereinabove. The device 310 also comprises second means 322 for transmitting, when the number of terminals evolves or in a regular manner, to all the terminals of the network an item of information making it possible to deduce the duration of the congestion window.

The first and second means constituting the congestion control device according to the invention can also be distinct or be merged into a single entity. They can be implemented by hardware modules or software modules.

The notion of logical frame no longer being taken into account during sending by the method of congestion control, each receiver must define a sufficiently large reception window and store the corresponding signal so as to receive and decode the various possible redundant fragments associated with one and the same useful fragment (corresponding at the minimum to the duration of the congestion window).

The method according to the invention can thus be implemented on the basis of hardware elements and/or software elements. It can notably be implemented in the guise of computer program comprising instructions for its execution. The computer program can be recorded on a recording medium readable by a processor.

The invention claimed is:

1. A method for controlling congestion in a communications network comprising a plurality of terminals able to send a message, said method comprising:
   receiving a message or a message fragment at a given instant,
   evaluating a number of terminals currently operating in transmission,
   determining a maximum input loading G of the network that results in negligible retransmission obtained with said input loading G in the network,
   defining a time interval, called a congestion window, of duration $\Delta Tf$ proportional to a number N of terminals currently operating in transmission and inversely proportional to said maximum input loading G of the network, and
   for each terminal and each message or message fragment to be sent, making a start of the congestion window coincide with said given instant of receipt of a message or message fragment, sending said message or message fragment at an instant defined as a random value taken in the congestion window,
   wherein the duration $\Delta Tf$ is normalized with respect to a time unit related to the duration of transmission of a message or message fragment and is taken equal to $$\Delta T_f = \frac{N \times 2}{G}.$$

2. The method of controlling congestion according to claim 1, in which, for each message or message fragment to be sent, at least one redundant message or message fragment is generated, the actual instant of sending of a redundant message or message fragment being defined as a random value taken in said congestion window whose start coincides with the given instant of receipt of said message or message fragment to be sent, the input loading G of the network is replaced with the normalized input loading of the network equal to the network input loading G divided by the total number of messages or message fragments associated with a message or message fragment to be sent.

3. The method of controlling congestion according to claim 1, in which the duration $\Delta Tf$ of the congestion window and the instant of transmission of said message are defined as integer numbers of timeslots, a timeslot having a constant duration at least equal to the duration required to transmit a message or message fragment.

4. The method of controlling congestion according to claim 1, comprising transmitting said message or message fragment to be sent with a delay equal to said actual instant of transmission.

5. The method of controlling congestion according to claim 1, in which the number N of terminals currently operating in transmission is evaluated by executing the following sub-steps, for each message sent by a terminal in the form of at least one fragment:
   identifying the index number or the position of the fragment sent from among the fragments belonging to said message,
   if the fragment sent is the $1^{st}$ fragment of a message, incrementing by one unit the number N of terminals currently operating in transmission,
   if the fragment sent is the last fragment of a message, decrementing by one unit the number N of terminals operating in transmission,
   if the fragment sent is the sole fragment of a message, incrementing by one unit the number N of terminals currently operating in transmission and then decrementing, after a predetermined duration, by one unit the number N of terminals currently operating in transmission.

6. A method for controlling congestion in a communications network comprising a plurality of terminals able to send a message, said method comprising:
   receiving a message or a message fragment at a given instant,
   evaluating a number of terminals currently operating in transmission,
   determining a maximum input loading G of the network that results in negligible retransmission obtained with said input loading G in the network,
   defining a time interval, called a congestion window, of duration $\Delta Tf$ proportional to a number N of terminals currently operating in transmission and inversely proportional to said maximum input loading G of the network, and
   for each terminal and each message or message fragment to be sent, making a start of the congestion window coincide with said given instant of receipt of a message or message fragment, sending said message or message fragment at an instant defined as a random value taken in the congestion window,
   wherein the maximum input loading G of the network which makes it possible to obtain a substantially zero rate of retransmissions is determined analytically or by simulation by varying the input loading of the network and by comparing it with the output loading, the input loading G retained being the maximum value of the input loading for which the output loading is substantially equal to the input loading.

7. A device for the control of congestion in a communications network comprising a plurality of terminals able to send a message, said device comprising:
   a processing module for evaluating a number of terminals currently operating in transmission, determining a maximum input loading G of the network that results in negligible retransmission obtained with said input loading G in the network and defining a time interval, called a congestion window, of duration $\Delta Tf$ configured so as to be proportional to a number N of terminals currently operating in transmission and inversely proportional to said maximum input loading G of the network; and a transmitter for transmitting, at a given frequency, to all the terminals of the network an item of information making it possible to deduce the duration ΔTf of the congestion window, wherein the duration ΔTf is normalized with respect to a time unit related to the duration of transmission of a message or message fragment and is taken equal to $$\Delta T_f = \frac{N \times 2}{G}.$$

8. The device according to claim 7, in which the first module is configured for executing the following sub-steps, for each message sent by a terminal in the form of at least one fragment:
   identifying the index number or the position of the fragment sent from among the fragments belonging to said message,
   if the fragment sent is the $1^{st}$ fragment of a message, incrementing by one unit the number of terminals currently operating in transmission,
   if the fragment sent is the last fragment of a message, decrementing by one unit the number of terminals currently operating in transmission,
   if the fragment sent is the sole fragment of a message, incrementing by one unit the number of terminals currently operating in transmission and then decrementing, after a predetermined duration, by one unit the number of terminals currently operating in transmission.

9. A sender terminal able to send a message in a communications network comprising a plurality of said terminals, comprising:
   a receiver for receiving an item of information configured to deduce a duration ΔTf of a time interval, called a congestion window, within which said message can be sent, a processing module for defining the actual instant of transmission of said message or of a fragment of said message as a random value taken in the congestion window whose start coincides with the given instant of receipt of said message, and
   a transmitter to transmit said message or message fragment with a delay equal to said instant of transmission, wherein the duration ΔTf is normalized with respect to a time unit related to the duration of transmission of a message or message fragment and is taken equal to $$\Delta T_f = \frac{N \times 2}{G},$$

where N is a number of terminals currently operating in transmission and G is a maximum input loading G of the network that results in negligible retransmission obtained with said input loading G in the network.

10. A communication network comprising a plurality of sender terminals according to claim 9 and at least one device for controlling congestion within said network, the device for the control of congestion in a communications network comprising:
   a plurality of terminals able to send a message, said device comprising a first module for determining a maximum input loading G of the network that results in negligible retransmission obtained with said input loading G in the network and defining a time interval, called a congestion window, of duration ΔTf configured so as to be proportional to the number N of terminals currently operating in transmission and inversely proportional to said maximum input loading G of the network, and
   a transmitter for transmitting, at a given frequency, to all the terminals of the network an item of information making it possible to deduce the duration ΔTf of the congestion window,
   wherein the duration ΔTf is normalized with respect to a time unit related to the duration of transmission of a message or message fragment and is taken equal to $$\Delta T_f = \frac{N \times 2}{G}.$$

11. A computer program comprising instructions stored on a tangible non-transitory recording medium for executing, on a processor, a method for controlling congestion in a communications network comprising a plurality of terminals able to send a message, said method comprising:
   receiving a message or a message fragment at a given instant,
   evaluating a number of terminals currently operating in transmission,
   determining a maximum input loading G of the network that results in negligible retransmission obtained with said input loading G in the network,
   defining a time interval, called a congestion window, of duration ΔTf proportional to the number N of terminals currently operating in transmission and inversely proportional to said maximum input loading G of the network, and
   for each terminal and each message or message fragment to be sent, making a start of the congestion window coincide with said given instant of receipt of a message or message fragment, sending said message or message fragment at an instant defined as a random value taken in the congestion window,
   wherein the duration ΔTf is normalized with respect to a time unit related to the duration of transmission of a message or message fragment and is taken equal to $$\Delta T_f = \frac{N \times 2}{G}.$$

12. A tangible non-transitory processor-readable recording medium on which is recorded a program comprising instructions for executing a method for controlling congestion in a communications network comprising a plurality of terminals able to send a message, said method comprising:
   receiving a message or a message fragment at a given instant,
   evaluating a number of terminals currently operating in transmission,
   determining a maximum input loading G of the network that results in negligible retransmission obtained with said input loading G in the network,
   defining a time interval, called a congestion window, of duration ΔTf proportional to the number N of terminals currently operating in transmission and inversely proportional to said maximum input loading G of the network, and
   for each terminal and each message or message fragment to be sent, making a start of the congestion window coincide with said given instant of receipt of a message or message fragment, sending said message or message fragment at an instant defined as a random value taken in the congestion window, wherein the duration ΔTf is normalized with respect to a time unit related to the duration of transmission of a message or message fragment and is taken equal to $$\Delta T_f = \frac{N \times 2}{G}.$$

13. A device for the control of congestion in a communications network comprising a plurality of terminals able to send a message, said device comprising:
   a processing module for evaluating a number of terminals currently operating in transmission, determining a maximum input loading G of the network that results in negligible retransmission obtained with said input loading G in the network and defining a time interval, called a congestion window, of duration ΔTf configured so as to be proportional to a number N of terminals currently operating in transmission and inversely proportional to said maximum input loading G of the network; and
   a transmitter for transmitting, at a given frequency, to all the terminals of the network an item of information making it possible to deduce the duration ΔTf of the congestion window,
   wherein the maximum input loading G of the network which makes it possible to obtain a substantially zero rate of retransmissions is determined analytically or by simulation by varying the input loading of the network and by comparing it with the output loading, the input loading G retained being the maximum value of the input loading for which the output loading is substantially equal to the input loading.

14. A computer program comprising instructions stored on a tangible non-transitory recording medium for executing, on a processor, a method for controlling congestion in a communications network comprising a plurality of terminals able to send a message, said method comprising:
   receiving a message or a message fragment at a given instant,
   evaluating a number of terminals currently operating in transmission,
   determining a maximum input loading G of the network that results in negligible retransmission obtained with said input loading G in the network,
   defining a time interval, called a congestion window, of duration ΔTf proportional to the number N of terminals currently operating in transmission and inversely proportional to said maximum input loading G of the network, and
   for each terminal and each message or message fragment to be sent, making a start of the congestion window coincide with said given instant of receipt of a message or message fragment, sending said message or message fragment at an instant defined as a random value taken in the congestion window,
   wherein the maximum input loading G of the network which makes it possible to obtain a substantially zero rate of retransmissions is determined analytically or by simulation by varying the input loading of the network and by comparing it with the output loading, the input loading G retained being the maximum value of the input loading for which the output loading is substantially equal to the input loading.

* * * * *